(12) United States Patent
Bauchot et al.

(10) Patent No.: US 7,146,561 B2
(45) Date of Patent: Dec. 5, 2006

(54) METHOD AND SYSTEM IN AN ELECTRONIC SPREADSHEET FOR COMPARING SERIES OF CELLS

(75) Inventors: Frederic Bauchot, St Jeannet (FR); Daniel Mauduit, Nice (FR); Benoit Sirot, St Jeannet (FR)

(73) Assignee: International Business Machines Corporation, Armonk, NY (US)

( * ) Notice: Subject to any disclaimer, the term of this patent is extended or adjusted under 35 U.S.C. 154(b) by 913 days.

(21) Appl. No.: 09/838,425

(22) Filed: Apr. 19, 2001

(65) Prior Publication Data

US 2002/0023106 A1   Feb. 21, 2002

(30) Foreign Application Priority Data

Jul. 13, 2000   (FR)   ................ 00 480059

(51) Int. Cl.
G06F 17/00 (2006.01)
G06F 15/00 (2006.01)

(52) U.S. Cl. .................................... 715/503
(58) Field of Classification Search ............. 715/503, 715/504, 538
See application file for complete search history.

(56) References Cited

U.S. PATENT DOCUMENTS

| | | | |
|---|---|---|---|
| 5,231,577 A * | 7/1993 | Koss ........................ 715/504 |
| 5,280,575 A * | 1/1994 | Young et al. ............... 715/504 |
| 5,359,729 A * | 10/1994 | Yarnell et al. ................ 707/2 |
| 5,371,675 A * | 12/1994 | Greif et al. ................. 715/503 |
| 5,418,902 A | 5/1995 | West et al. |
| 5,499,180 A * | 3/1996 | Ammirato et al. .......... 715/503 |
| 5,504,848 A | 4/1996 | Yamada et al. |
| 5,598,519 A * | 1/1997 | Narayanan ................... 715/504 |
| 5,603,021 A | 2/1997 | Spencer et al. |
| 5,604,854 A * | 2/1997 | Glassey ...................... 715/503 |
| 5,613,131 A * | 3/1997 | Moss et al. ................. 715/509 |
| 5,701,499 A | 12/1997 | Capson et al. |
| 5,708,827 A | 1/1998 | Kaneko et al. |
| 5,713,020 A | 1/1998 | Reiter et al. |
| 5,806,078 A | 9/1998 | Hug et al. |
| 5,819,293 A | 10/1998 | Comer et al. |
| 5,848,393 A * | 12/1998 | Goodridge et al. ............. 705/8 |
| 5,881,381 A | 3/1999 | Yamashita et al. |
| 5,883,623 A * | 3/1999 | Cseri ......................... 715/866 |
| 5,893,087 A | 4/1999 | Wlaschin et al. |
| 5,983,268 A * | 11/1999 | Freivald et al. ............. 709/218 |
| 5,987,481 A * | 11/1999 | Michelman et al. ........ 715/503 |
| 6,055,548 A | 4/2000 | Comer et al. |
| 6,057,837 A | 5/2000 | Hatakeda et al. |
| 6,282,551 B1 * | 8/2001 | Anderson et al. ........... 715/503 |
| 6,327,592 B1 | 12/2001 | Yoshikawa |

(Continued)

OTHER PUBLICATIONS

"Formulas and Logic Downloads", www.xl-logic.com/pages/formulas.html, downloaded by Examiner on Jun. 17, 2003.*

(Continued)

*Primary Examiner*—Shahid Alam
*Assistant Examiner*—R. Stevens
(74) *Attorney, Agent, or Firm*—Stephen J. Walder, Jr.; David A. Mims, Jr.

(57) ABSTRACT

An example of a solution provided here involves identifying two series of cells to be compared in a multi dimensional spreadsheet, performing intermediary tests, and deriving the result of the comparison: the first series may be included in the second series, include the second series, be the same as the second series, overlap the second series, or be disjoined from the second series, for example.

7 Claims, 10 Drawing Sheets

U.S. PATENT DOCUMENTS

| | | | |
|---|---|---|---|
| 6,438,565 B1* | 8/2002 | Ammirato et al. | 715/503 |
| 6,496,832 B1* | 12/2002 | Chi et al. | 707/102 |
| 6,640,234 B1* | 10/2003 | Coffen et al. | 715/538 |
| 6,701,485 B1 | 3/2004 | Igra et al. | |
| 6,948,154 B1 | 9/2005 | Rothermel et al. | |
| 2001/0049699 A1* | 12/2001 | Pratley et al. | 707/503 |
| 2002/0038303 A1* | 3/2002 | Gelfand | 707/100 |
| 2002/0091728 A1 | 7/2002 | Kjaer et al. | |

OTHER PUBLICATIONS

Blood, Aaron T., "cond_sum_array SpreadSheet", Jan. 6, 1999 (www.XL-Logic.com).*

Blood, Aaron T., "equal_val SpreadSheet", Aug. 10, 1999 (www.XL-Logic.com).*

Blood, Aaron T., "option_box SpreadSheet", Jul. 16, 1999 (www.XL-Logic.com).*

Blood, Aaron T., "same_or_diff SpreadSheet", Sep. 1, 1999 (www.XL-Logic.com).*

Blood, Aaron T., "sum_between_switches SpreadSheet", Sep. 3, 1999 (www.XL-Logic.com).*

Blood, Aaron T., "sum_if SpreadSheet", Aug. 19, 1999 (www.XL-Logic.com).*

Deitel et al., JAVA: How To Program, 2nd Edition, Prentice Hall, Upper Saddle River, NJ, pp. 955-975 (©1998).*

Gold et al., The Complete Idiot's Guide to Microsoft Excel 97, 2nd Edition, Que Corporation, Que Corporation, pp. 53-62 (©1998).*

Granel, Vincent, "The Xxl Spreadsheet Project", Linux Journal, vol. 1999, issue 60es (Apr. 1999), ISSN: 1075-3583. (http://delivery.acm.org/10.1145/330000/327756/a27-linux_journal_staff.html?key1=327756&key2=5612137801&coll=ACM&dl=ACM&CFID=22784040&CFTOK.*

Isakowitz et al., "Toward a Logical/Physical Theory of Spreadsheet Modeling", ACM Transactions on Information Systems, vol. 13, No. 1, Jan. 1995, pp. 1-37 (ACM 1046-8188/95/0100-0001).*

Jamsa et. al., Jamsa's C/C++ Programmer's Bible: The Ultimate Guide to C/C++ Programming, Jamsa Press, (c) 1998, sections 87-106, 1161-1161 and 1228-1229.*

Microsoft Press Computer Dictionary, 3rd Edition, Microsoft Press, Redmond, WA, 1997, pp. 126 and 299.*

"Spreadsheet Programming: The New Paradigm in Rapid Application Development", Knowledge Dynamics, Inc., © 2002 (www.KnowledgeDynamics.com).*

Deitel, H. M., et al., C++: How To Program, 2nd Edition, Prentice Hall, Upper Saddle River, NJ, © 1994, pp. 10, 106-110, 147, 243-244, 256-262, 448, 473-479, 483-485, 707-730, 981-987 and 1043-1045.*

Kelly, Julia, Using Microsoft Excel 97, 3rd Edition, Que Corp., Indianapolis, IN, © 1998, pp. 124-131, 138-144, 154-189, 209-210 and 337-343.*

Microsoft Computer Dictionary, 4th Edition, Microsoft Press, Redmond, WA, © 1999, pp. 29, 56-58, 79, 229, 272, 420 and 434.*

Hergert, Douglas, "Mastering 1-2-3® 97 Edition for Windows® 95", Sybex Inc., San Francisco, CA, © 1997, pp. 123-127, 130-147, 248-267, 277-279, 436-489, 615-621, 664-666, and 672-674.

Kernighan et al., The C Programming Language, p. 41, Prentice-Hall, Inc., Englewood Cliffs, NJ, ©1978.

Kelly, Julia, Using Microsoft Excel 97, 3$^{rd}$ Edition, pp. 118-122, Que Corp., Indianapolis, IN, ©1998.

Microsoft Press Computer Dictionary, 3$^{rd}$ Edition, pp. 30, 133 and 399, Microsoft Press, Redmond, WA, ©1997.

* cited by examiner

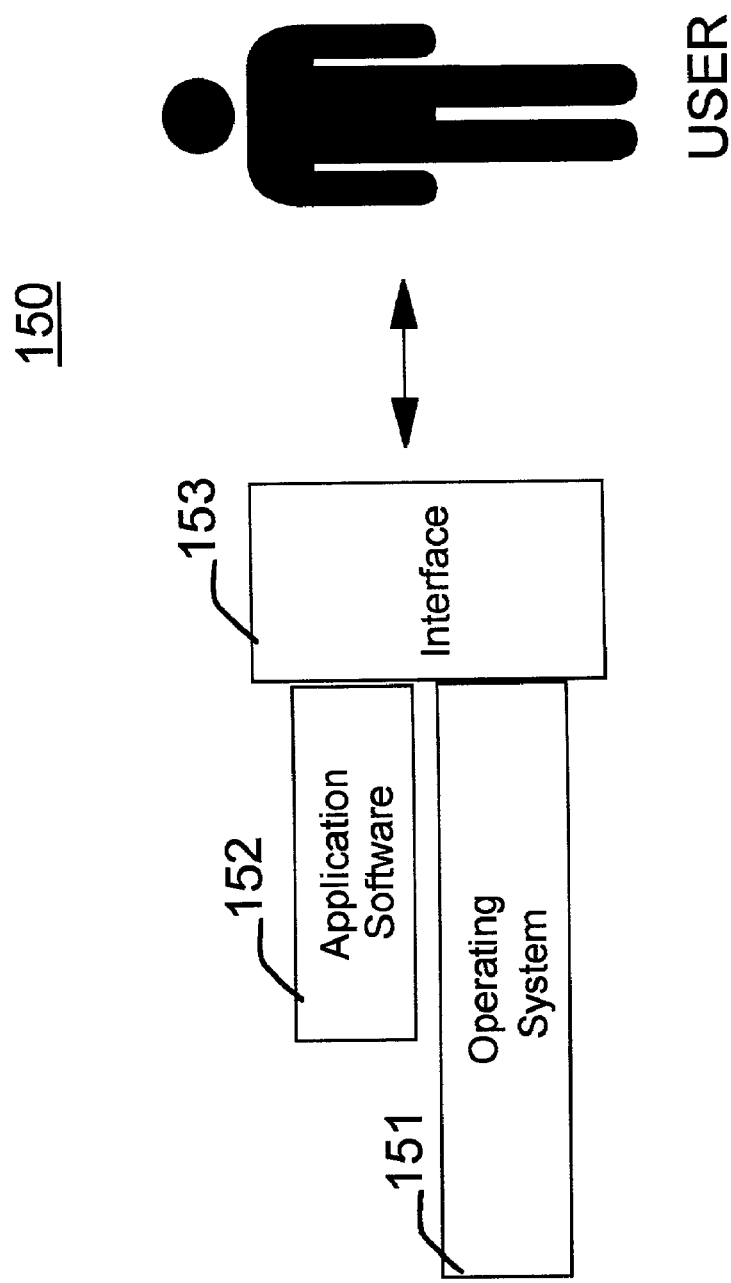

Comp(A1,B1) = OVERLAP
Comp(A1,B2) = DISJOINED
Comp(A2,B1) = OVERLAP
Comp(A2,B2) = B_IN_A Comp(A,B) = B_IN_A Comp(A1,B1) = OVERLAP
Comp(A1,B2) = DISJOINED
Comp(A2,B1) = OVERLAP
Comp(A2,B2) = B_IN_A Comp(A,B) = OVERLAP

FIG. 4A

|   | True | False |
|---|---|---|
| A | Atrue | Afalse |
| B | Btrue | Bfalse |

400, 401, 402, 403, 404

|   | True | False |
|---|---|---|
| A | True | True |
| B | True | True |

Result = OVERLAP

FIG. 4B

|   | True | False |
|---|---|---|
| A | True | True |
| B | True | False |

Result = B_IN_A

FIG. 4C

|   | True | False |
|---|---|---|
| A | True | False |
| B | False | True |

Result = DISJOINED

FIG. 4D

|   | True | False |
|---|---|---|
| A | False | True |
| B | True | False |

Result = SAME

FIG. 4E

|   | True | False |
|---|---|---|
| A | False | True |
| B | True | True |

Result = A_IN_B

FIG. 4F

METHOD AND SYSTEM IN AN ELECTRONIC SPREADSHEET FOR COMPARING SERIES OF CELLS

TECHNICAL FIELD OF THE INVENTION

The present invention relates to the field of information processing by digital computers, and more particularly to a method and system, in an electronic spreadsheet, for comparing series of cells.

BACKGROUND ART

Before computers, numerical analyses, particularly financial ones, were usually prepared on an accountant's columnar pad or spreadsheet, with pencil and calculator in hand. By organising data into columns and rows, spreadsheets afford the rapid assimilation of information by a reader. The task of preparing a spreadsheet on paper, however, is not quite so fast. Instead, the process tends to be very slow, as each entry must be tediously calculated and entered into the spreadsheet. Since all calculations are the responsibility of the preparer, manually prepared spreadsheets are also prone to errors. Hence, preparation of spreadsheets by hand is slow, tedious, and unreliable.

With the advent of microcomputers, a solution was forthcoming in the form of "electronic spreadsheets." Better known simply as "spreadsheets," these software programs provide a computerised replacement for the traditional financial modelling tools: the accountant's columnar pad, pencil, and calculator. In some regards, spreadsheet programs are to those tools what word processors are to typewriters. Spreadsheets offer dramatic improvements in ease of creating, editing, and using financial models.

A typical spreadsheet program configures the memory of a computer to resemble the column/row or grid format of an accountant's columnar pad, thus providing a visible calculator for a user. Because this "pad" exists dynamically in the computer's memory, however, it differs from paper pads in several important ways. Locations in the electronic spreadsheet, for example, must be communicated to the computer in a format which it can understand. A common scheme for accomplishing this is to assign a number to each row in a spreadsheet, a letter to each column, and another letter to each sheet (or page) of the spreadsheet. To reference a location at column A and row 1 of the second page (i.e., the upper-left hand corner), for example, the user types in "B:A1". In this manner, the spreadsheet defines an addressable storage location or "cell" at each intersection of a row with a column within a given page.

Data entry into an electronic spreadsheet occurs in much the same manner that information would be entered on an accountant's pad. After a screen cursor is positioned at a desired location, the user can enter alphanumeric information. Besides holding text and numeric information, however, spreadsheet cells can store special instructions or "formulas" specifying calculations to be performed on the numbers stored in spreadsheet cells. Such spreadsheet cells can also be defined and named as a range as long as they are arranged as a convex set of cells. A typical example of such a named range simply corresponds to a regular table found in an accountant's pad. In this fashion, range names can serve as variables in an equation, thereby allowing precise mathematical relationships to be defined between cells. The structure and operation of a spreadsheet program, including advanced functions such as functions and macros, are documented in the technical, trade, and patent literature. For an overview, see e.g., Cobb, S., *Using Quattro Pro* 2, Borland-OsbomeIMcGraw-Mll, 1990; and LeBlond, G. and Cobb, D., *Using* 1-2-3, Que corp., 1985. The disclosures of each of the foregoing are hereby incorporated by reference.

Electronic spreadsheets offer many advantages over their paper counterparts. For one, electronic spreadsheets are much larger (i.e., hold more information) than their paper counterparts; electronic spreadsheets having thousands or even millions of cells are not uncommon. Spreadsheet programs also allow users to perform "what-if" scenarios. After a set of computational relationships has been entered into a worksheet, thanks to imbedded formulas for instance, the spread of information can be recalculated using different sets of assumptions, with the results of each recalculation appearing almost instantaneously. Performing this operation manually, with paper and pencil, would require recalculating every relationship in the model with each change made. Thus, electronic spreadsheet systems were invented to solve "what-if" problems, that is, changing an input and seeing what happens to an output.

Conventional spreadsheets come today with some imbedded facilities allowing the spreadsheet user to develop his/her own tools addressing his/her own specific needs. The most popular facility of that kind is known as the "macro" language which corresponds to a programming language allowing to automate tasks that the user would instead perform manually. Such a language can be used advantageously when the manipulations performed within a spreadsheet correspond to repetitive steps which can be "packaged" within automated macros. Besides the gain in efficiency provided by such macros, the macros present also the advantage of reducing, if not eliminating, user errors during spreadsheet manipulations. Indeed as the successive steps of a given macro will be followed each time the macro is invoked, any correction applied to a problem found during the execution of the macro will be recorded in the macro, and thus reapplied later on for each new call of the macro. Besides the macro language itself, the macro facility often includes an integrated macro development environment aimed to facilitate the development of macros or the sharing of macros between different spreadsheets. Such environments are typically based on object oriented (OO) techniques which are today the de facto standard for software engineering.

When macros are developed in an electronic spreadsheet, one of the typical objects manipulated by the macro language corresponds to spreadsheet cells which can be arranged as ranges of cells, or more generally to what we call series of cells. A range of cells can be defined as a convex set of cells. A series of cells can be defined as a set of convex sets of cells. When objects such as series of cells are part of the logic of a macro, it is common to have to compare two different objects of this type. This type of comparison aims at determining if a first series of cells is either disjoined from, or equal to, or included in, or overlapping with, or including a second series of cells. The conventional techniques used to perform this type of comparison, such as the ones documented in the technical literture, rely on a geometrical representation of cells within an electronic spreadsheet. For instance a sheet within a electronic spreadsheet can be formally represent by a geometrical plan, with two coordinates. Any cell belonging to this sheet is associated with a row coordinate and with a column coordinate. With such a formal representation, the comparison of two ranges of cells (named "A" and "B") within a given sheet can be performed with a macro of the following kind:

```
REM Work with rows
if A.StartRow<B.StartRow then
    if B.StartRow<A.EndRow then
        if A.EndRow<B.EndRow then Row=OVERLAP else Row=
            B_IN_A
    else
            if B.StartRow>A.EndRow then Row=DISJOINED else
Row=OVERLAP
    endif
else
    if A.StartRow>B.StartRow then
        if A.StartRow<B.EndRow then
            if B.EndRow<A.EndRow then Row=OVERLAP else Row=
                A_IN_B
        else
                if A.StartRow>B.EndRow then Row=
                    DISJOINED else
Row=OVERLAP
        endif
    else
        if A.EndRow<B.EndRow then
            Row=A_IN_B
        else
            if B.EndRow<A.EndRow then Row=B_IN_A
            else Row=SAME
            endif
        endif
    endif
endif
REM work with columns
if A.StartCol<B.StartCol then
    if B.StartCol<A.EndCol then
        if A.EndCol<B.EndCol then Col=OVERLAP else Col=
            B_IN_A
    else
            if B.StartCol>A.EndCol then Col=
                DISJOINED else
Col=OVERLAP
    endif
else
    if A.StartCol>B.StartCol then
        if A.StartCol<B.EndCol then
            if B.EndCol<A.EndCol then Col=OVERLAP else Col=
                A_IN_B
        else
                if A.StartCol>B.EndCol then Col=
                    DISJOINED else
Col=OVERLAP
        endif
    else
        if A.EndCol<B.EndCol then
            Col=A_IN_B
        else
            if B.EndCol<A.EndCol then Col=B_IN_A
            else Col=SAME
            endif
        endif
    endif
endif
REM get the final comparison on range
if Col=DISJOINED OR Row=DISJOINED then
    Range=DISJOINED
else
    if Col=OVERLAP OR Row=OVERLAP then
        Range=OVERLAP
    else
        if Col=SAME then
            Range=Row
        else
            if Row=SAME then
                Range=Col
            else
                if Row=Col then Range=Row else Range=OVERLAP
            endif
        endif
    endif
endif
```

The above program is not very complex and relatively fast to execute (the longest path corresponding to 13 statements to execute), but it only performs the comparison of two ranges of cells in a two-dimensionnal spreadsheet. When ranges of cells must be compared in a three-dimensionnal spreadsheet (as it is the case for conventional electronic spreadsheets available on the market), then its complexity remains at the same level, but the execution time is increased. With multi-dimensionnal environments containing more than 3 dimensions, the execution time may become excessive.

If now series of cells have to be compared, then another level of complexity is introduced. Let illustrates it with a simple example in a two-dimensionnal spreadsheet: two series of cells named "A" and "B", each constituted by two ranges of cells respectively named "A1", "A2" and "B1", "B2", are compared to determine if the series of cells "A" is either disjoined from, or equal to, or included in, or overlapping with, or including the series of cells "B". As "A1", "A2", "B1" and "B2" are ranges of cells, a natural thought process would be to first compare each of the ranges "A1" and "A2" with each of the ranges "B1" and "B2", and then to perform some logic based on the results of the four range comparisons ("A1" vs "B1", "A1" vs "B2", "A2" vs "B1", and "A2" vs "B2"). It turns out that this method cannot properly resolve some situations, as illustrated in FIG. 3A and in FIG. 3B. Within FIG. 3A are represented the four ranges "A1", "A2" (both shown as rectangles with solid lines), and "B1", "B2" (both shown as rectangles with dashed lines). The comparison between the ranges belonging to the series "A" and the ranges belonging to the series "B" gives the following result, by using obvious notations: Comp (A1,B1)=OVERLAP; Comp (A1,B2)=DISJOINED; Comp (A2,B1)=OVERLAP; Comp (A2,B2)=B_IN_A. As far as the series "A" and "B" are concerned, the comparison is Comp (A,B)=B_IN_A because all the cells belonging to the series B belong also to the series A while the reverse is not true. Looking now at the FIG. 3B, the ranges "A1", "A2", "B1" and "B2" compare between them the same way (Comp (A1,B1)=OVERLAP; Comp (A1,B2)=DISJOINED; Comp (A2,B1)=OVERLAP; Comp (A2,B2)=B_IN_A) but the comparison between the series "A" and "B" is Comp (A,B)=OVERLAP because there exists some cells of the series B belonging to the series A and others not belonging to the series A. To discriminate between the two cases illustrated in the FIG. 3A and in the FIG. 3B, some additional logic must be introduced on top of the individual range comparison, moving the complexity and the efficiency of this conventional approach to unacceptable limits.

The present invention defines a system and a method for resolving the above mentioned problem in a way which first does not depend on the number of dimensions defined in the working environment, and which second does not depend on the structure of the objects to be compared. The present invention takes advantage of the inheritance properties available in object oriented environments.

SUMMARY OF THE INVENTION

The present invention relates to the field of information processing by digital computers, and more particularly to a method and system, in an electronic spreadsheet, for comparing two series of cells, a series of cells comprising one or a plurality of cell range, a cell range comprising one or a plurality of cells. The method of comparing two series of cells comprises the steps of:

defining a boolean attribute, said boolean attribute having a first and a second value;

assigning the first value of said boolean attribute to each cell of a first series of cells;

assigning the second value of said boolean attribute to each cell of a second series of cells;

determining in a first operation whether all the cells of said first series of cells share the same first value of said boolean attribute, or share the same second value of said boolean attribute or do not share a same single value of said boolean attribute;

assigning the first value of said boolean attribute to each cell of the first series of cells;

determining in a second operation whether all the cells of the second series of cells share the same first value of said boolean attribute, or share the same second value of said boolean attribute or do not share a same single value of said boolean attribute;

determining whether the first series and the second series are the same or are disjoined or overlap, or are included one into the other by comparing results of the first operation and the second operation:

if all the cells of the first series share the same first value of said boolean attribute in said first operation and if all the cells of the second series share the same second value of said boolean attribute in said second operation, the first series and the second series are disjoined;

if all the cells of the first series share the same second value of said boolean attribute in said first operation and if all the cells of the second series share the same first value of said boolean attribute in said second operation, the first series and the second series are the same;

if all the cells of the first series share the same second value of said boolean attribute in said first operation and if all the cells of the second series do not share the same single value of said boolean attribute in said second operation, the first series is included in the second series;

if all the cells of the first series do not share the same single value of said boolean attribute in said first operation and if all the cells of the second series share the same first value of said boolean attribute in said second operation, the second series is included in the second series;

if all the cells of the first series do not share the same single value of said boolean attribute in said first operation and if all the cells of the second series do not share the same single value of said boolean attribute in said second operation, the first series and the second series overlap.

BRIEF DESCRIPTION OF THE DRAWINGS

The novel and inventive features believed characteristics of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

FIG. 1B is a block diagram of a software system including an operating system, an application software, and a user interface for carrying out the present invention.

FIG. 2B shows the toolbar component of the notebook interface shown in FIG. 2A.

FIGS. 2C and 2D show page identifiers for rapidly accessing and manipulating individual pages of the notebook interface shown in FIG. 2A.

FIG. 3A and 3B illustrate an example showing that the relative comparison of ranges belonging to different series of cells does not determine how compare the series they belong to.

FIG. 4 illustrates the structure of the Comparison Table in the preferred embodiment of the present invention

DETAILED DESCRIPTION OF THE PREFERRED EMBODIMENT

System Hardware

Figure 1A:
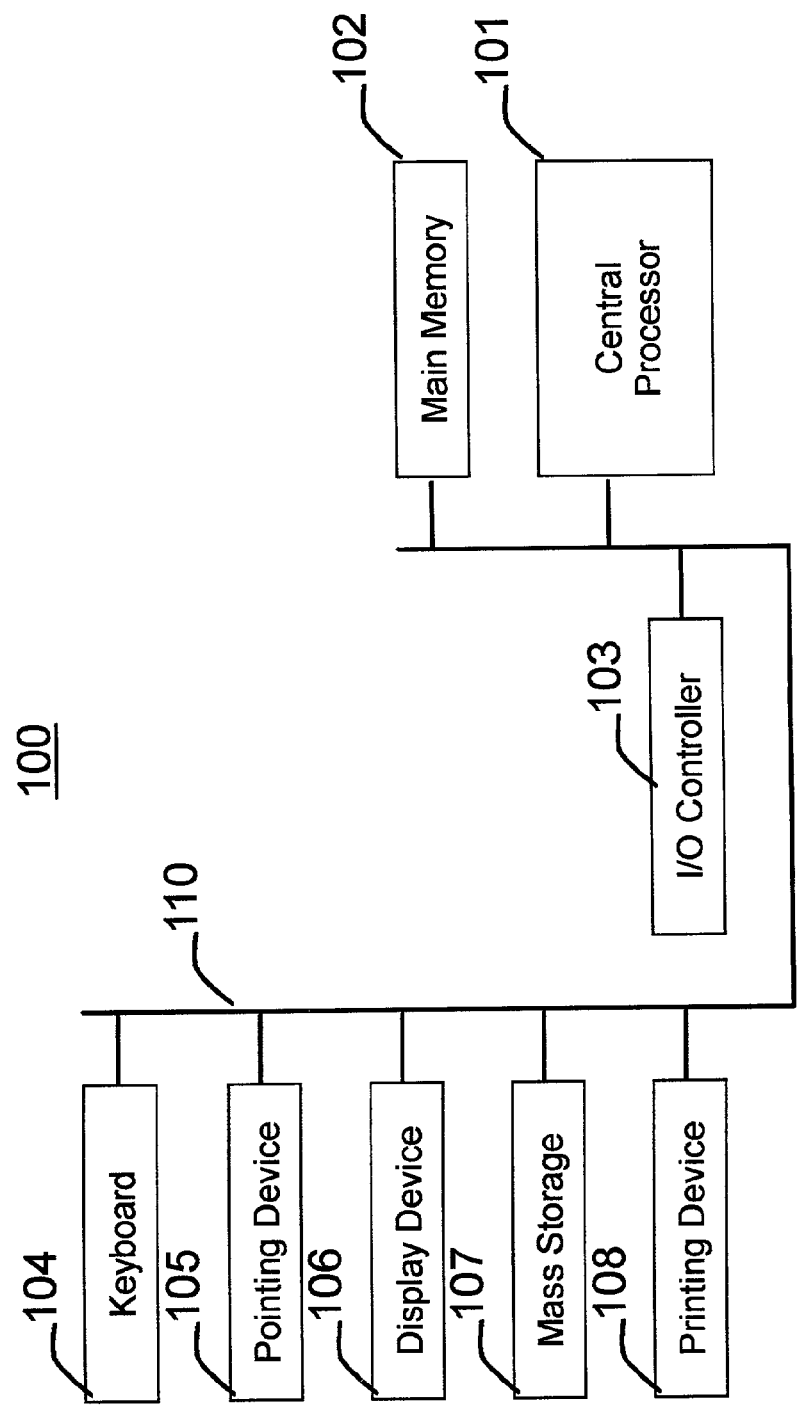
FIG. 1A is a block diagram of a computer system in which the present invention may be embodied.

As shown in FIG. 1A, the present invention may be embodied on a computer system 100 comprising a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a printing device 108, may be included in the system 100 as desired. As illustrated, the various components of the system 100 communicate through a system bus 110 or similar architecture. In a preferred embodiment, the computer system 100 includes an IBM-compatible personal computer, which is available from several vendors (including International Business Machine—IBM Corporation of Armonk, N.Y.).

Illustrated in FIG. 1B, a computer software system 150 is provided for directing the operation of the computer system 100. Software system 150, which is stored in system memory 102 and on disk memory 107, includes a kernel or operating system 151 and a shell or interface 153. One or more application programs, such as application software 152, may be "loaded' (i.e., transferred from storage 107 into memory 102) for execution by the system 100. The system 100 receives user commands and data through user interface 153; these inputs may then be acted upon by the system 100 in accordance with instructions from operating module 151 and/or application module 152. The interface 153, which is preferably a graphical user interface (GUI), also serves to display results, whereupon the user may supply additional inputs or terminate the session. In a preferred embodiment, operating system 151 and interface 153 are Microsoft Win95, available from Microsoft Corporation of Redmond, Wash. Application module 152, on the other hand, includes a spreadsheet notebook of the present invention as described in further detail herein below.

Interface

A. Introduction

The following description will focus on the presently preferred embodiments of the present invention, which are embodied in spreadsheet applications operative in the Microsoft Win95 environment. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, NextStep, and the like. Therefore, the description of the exemplary embodiments which follows is for purposes of illustration and not limitation.

Figure 1C:
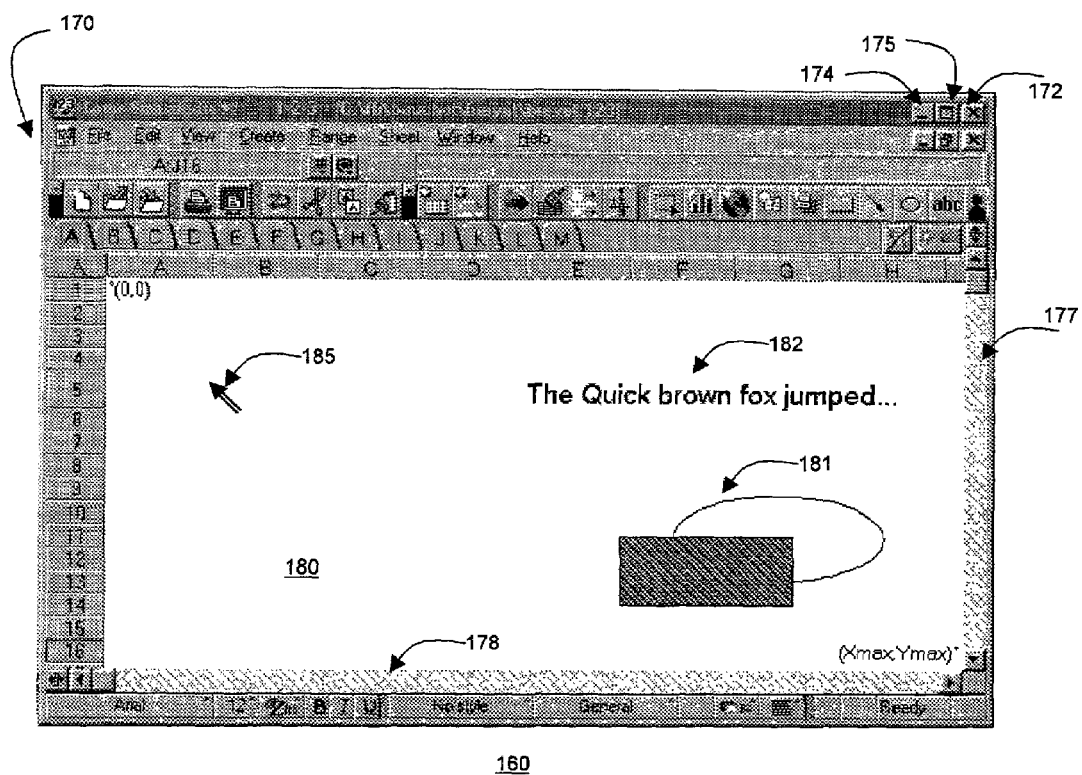
FIG. 1C illustrates the basic architecture and functionality of a graphical user interface in which the present invention may be embodied.

Referring now to FIG. 1C, the system 100 includes a windowing interface or workspace 160. Window 160 is a rectangular, graphical user interface (GUI) for display on screen 106; additional windowing elements may be displayed in various sizes and formats (e.g., tiled or cascaded), as desired. At the top of window 160 is a menu bar 170 with a plurality of user-command choices, each of which may invoke additional submenus and software tools for use with application objects. Window 160 includes a client area 180 for displaying and manipulating screen objects, such as graphic object 181 and text object 182. In essence, the client area is a workspace or viewport for the user to interact with data objects which reside within the computer system 100.

Windowing interface 160 includes a screen cursor or pointer 185 for selecting and otherwise invoking screen objects of interest. In response to user movement signals from the pointing device 105, the cursor 185 floats (i.e., freely moves) across the screen 106 to a desired screen location. During or after cursor movement, the user may generate user-event signals (e.g., mouse button "clicks" and "drags") for selecting and manipulating objects, as is known in the art. For example, Window 160 may be closed, re-sized, or scrolled by "clicking" (selecting) screen components 172, 174/5, and 177/8, respectively.

In a preferred embodiment, screen cursor 185 is controlled with a mouse device. Single-button, double-button, or triple-button mouse devices are available from a variety of vendors, including Apple Computer of Cupertino, Calif., Microsoft Corporation of Redmond, Wash., and Logitech Corporation of Fremont, Calif., respectively. More preferably, screen cursor control device 105 is a two-button mouse device, including both right and left "mouse buttons."

Programming techniques and operations for mouse devices are well documented in the programming and hardware literature; see e.g., *Microsoft Mouse Programmer's Reference*, Microsoft Press, 1989. The general construction and operation of a GUI event-driven system, such as Windows, is also known in the art: see, e.g., Petzold, C., *Programming Windows*, Second Edition, Microsoft Press, 1990. The disclosures of each are hereby incorporated by reference.

B. Preferred Interface

Figures 1, 2A:
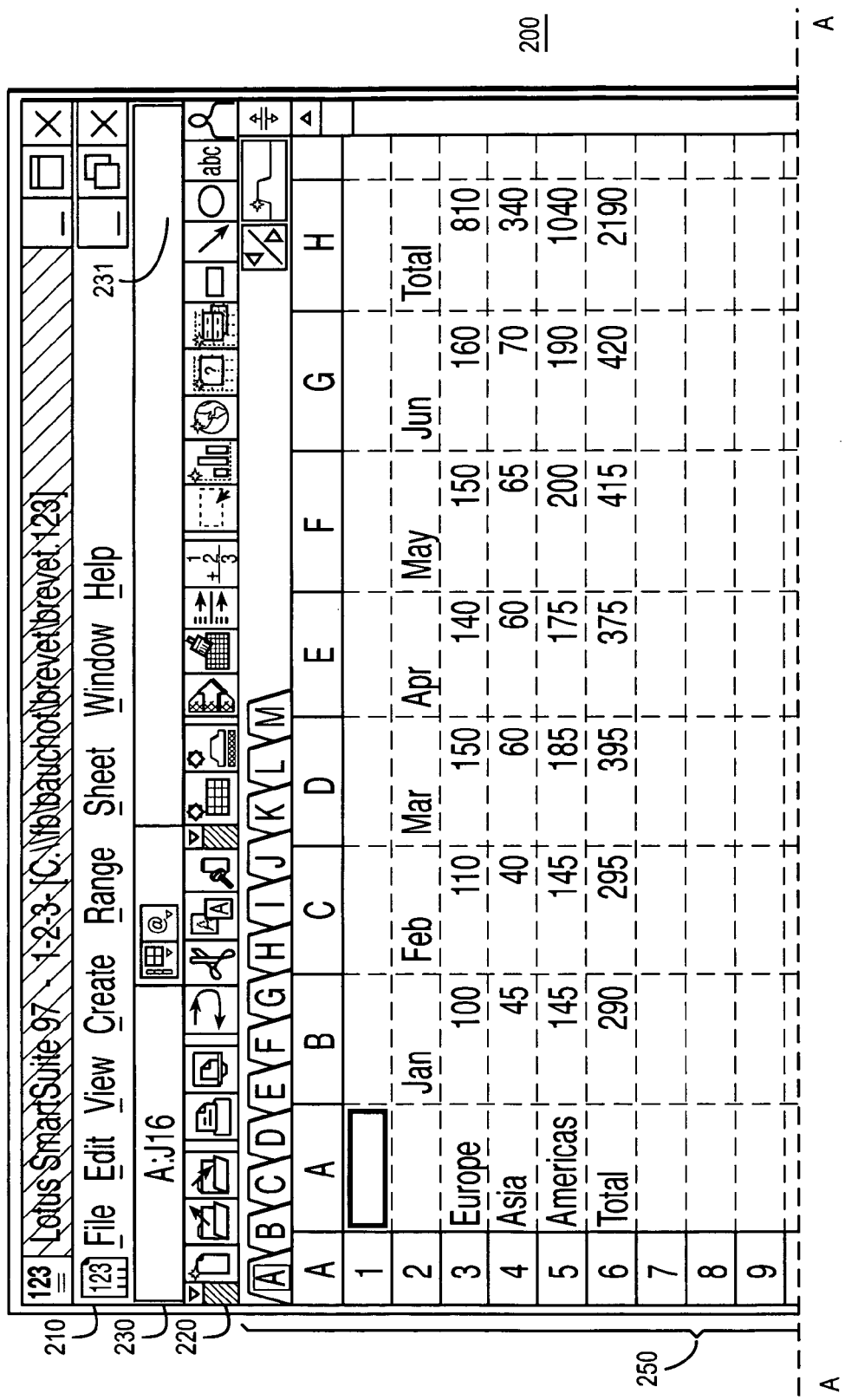
FIG. 2A shows a spreadsheet notebook interface according to the preferred embodiment of the present invention.
Figures 2, 2A:
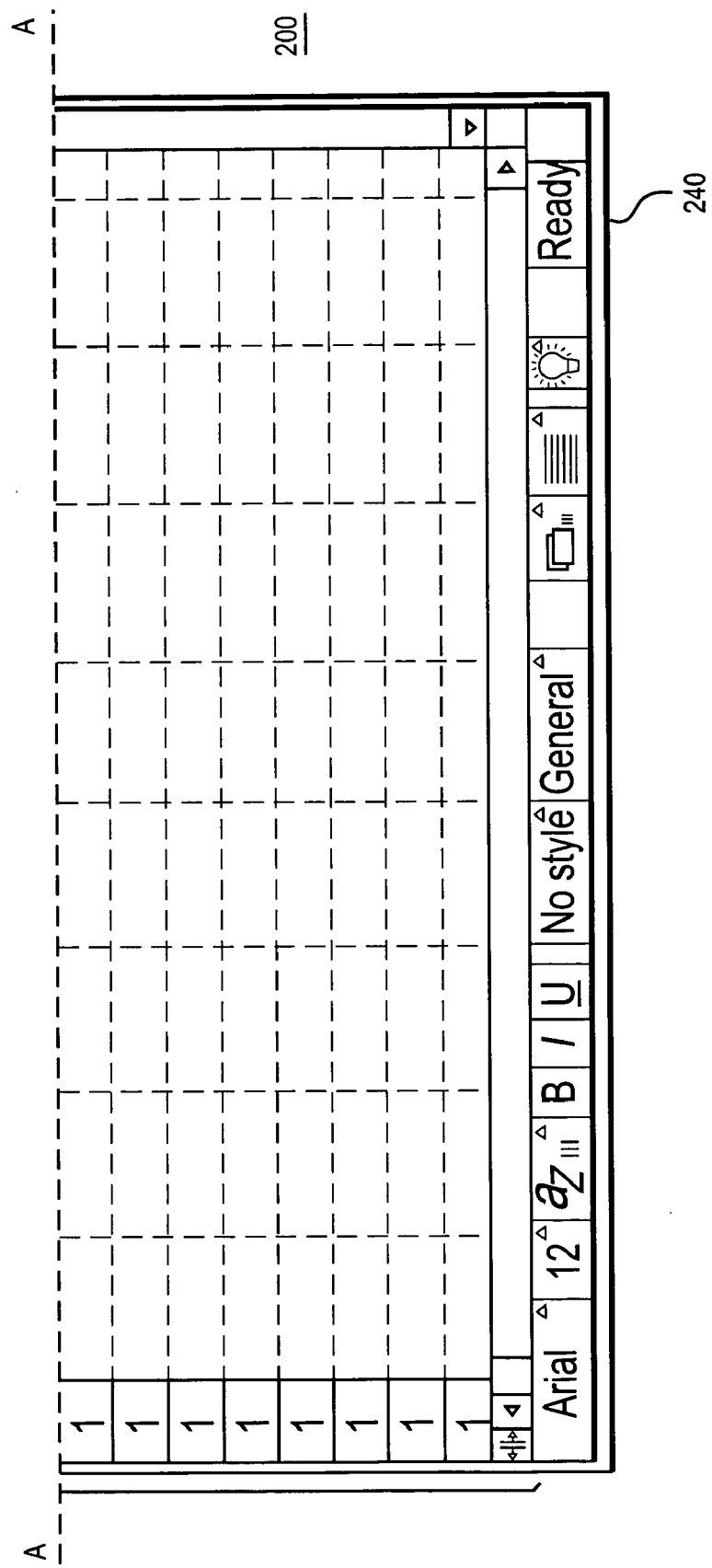
Figure 3A:
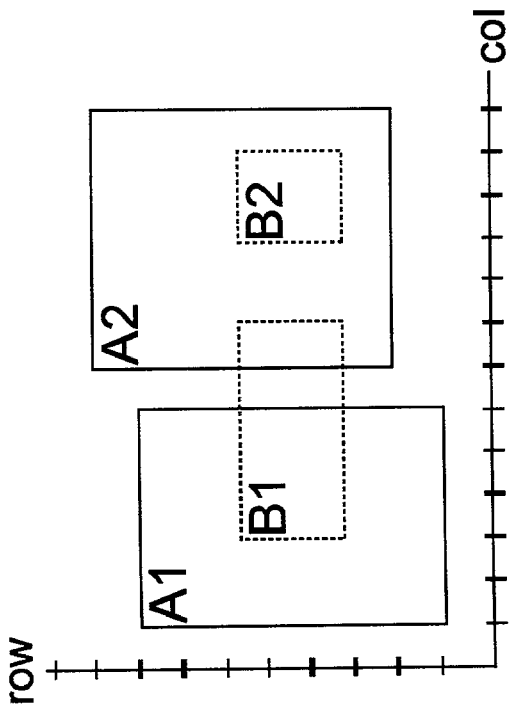
Figure 3B:
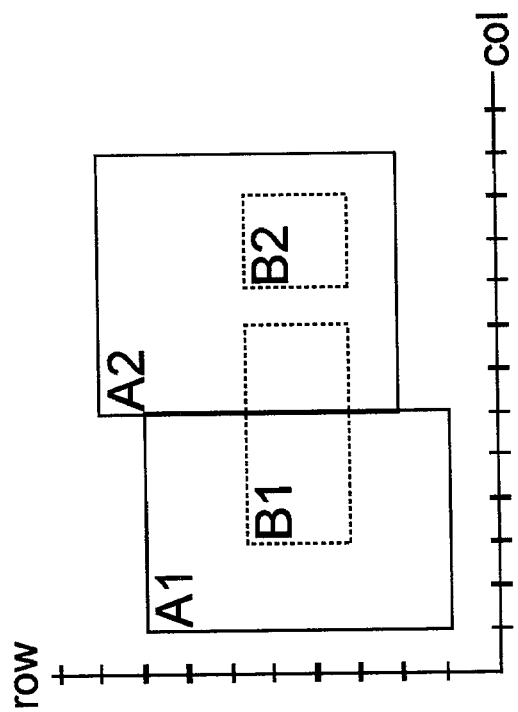

Shown in FIG. 2A, a spreadsheet notebook interface of the present invention will now be described The spreadsheet notebook or workbook of the present invention includes a notebook workspace 200 for receiving, processing, and presenting information, including alphanumeric as well as graphic information. Notebook workspace 200 includes a menu bar 210, a toolbar 220, a current cell indicator 230, an input line 231, a status line 240, and a notebook window 250. The menu bar 210 displays and invokes, in response to user inputs, a main level of user commands. Menu 210 also invokes additional pull down menus, as is known in windowing applications. Input line 231 accepts user commands and information for the entry and editing of cell contents, which may include data, formulas, macros, and the like. Indicator 230 displays an address for the current cursor (i.e., active cell) position, or the address or name of a selected named range (i.e. active selection). At the status line 240, system 100 displays information about the current state of the workbook; for example, a "READY" indicator means that the system is ready for the user to select another task to be performed.

The toolbar 220, shown in further detail in FIG. 2B, comprises a row or palette of tools which provide a quick way for the user to choose commonly-used menu commands or properties. In an exemplary embodiment, toolbar 220 includes file manipulation buttons 221, printing buttons 222, an undo button 223, cut, copy, and paste buttons 224, information pop-up window buttons tool 225, a named range selection button 226, a style copy button 227, a column re-sizing button 228, and a sum button 229. The functions of these buttons are suggested by their names. For instance, buttons 224 cut, copy and paste data and objects to and from Windows' clipboard. The same actions are also available as corresponding commands in the Edit menu (available from menu bar 210).

The notebook, which provides an interface for entering and displaying information of interest, includes a plurality of spreadsheet pages. Each page may include conventional windowing features and operations, such as moving, re-sizing, and deleting. In a preferred embodiment, the notebook includes 256 spreadsheet pages, all of which are saved as a single disk file on the mass storage 107. Workspace 200 may display one or more notebooks, each sized and positioned (e.g., tiled, overlapping, and the like) according to user-specified constraints.

Each spreadsheet page of a notebook includes a 2-D spread. Page A from the notebook 200, for example, includes a grid in row and column format, such as row 3 and column F. At each row/column intersection, a box or cell (e.g., cell C4) is provided for entering, processing, and displaying information in a conventional manner. Each cell is addressable, with a selector being provided for indicating a currently active one (i.e., the cell that is currently selected).

As shown in FIGS. 2C–D, individual notebook pages are identified by page identifiers 260a and 260b, preferably located along one edge of a notebook. In a preferred embodiment, each page identifier is in the form of a tab member (e.g., members 261a, 262a, 263a) situated along a top edge of the notebook. Each tab member may include representative indicia, such as textual or graphic labels, including user selected titles representing the contents of a corresponding page. In FIG. 2C, the tab members 260a are set to their respective default names. For example, the first three tab members (members 261a, 262a, 263a) are respectively set to A, B, and C. Tab members are typically given descriptive names provided by the user, however. As shown in FIG. 2D, for example, the first three tab members have now been set to "Contents" (tab member 261a), "Summary" (tab member 262a), and "Jan" (tab member 263a). In a similar manner, the remaining tabs are set to subsequent months of the year. In this manner, the user associates the page identifiers with familiar tabs from an ordinary paper notebook. Thus, the user already knows how to select a page or spread of interest: simply select the tab corresponding to the page (as one would do when selecting a page from a paper notebook).

In addition to aiding in the selection of an appropriate page of information, the user-customizable page identifiers serve aid in the entry of spreadsheet named range addresses. For example, when entering a formula referring to a named range of cells on another page, the user may simply use the descriptive page name in the named range address, thus making it easier for the user to understand the relationship of the cell(s) or information being referenced.

A general description of the features and operation of the spreadsheet notebook interface may be found in Quattro Pro for Windows (*Getting Started, User's Guide and Building Spreadsheet Applications*), available from Borland International.

Comparison of Series of Cells

A. Introduction

As the power of spreadsheet environments has increased since several years, it is today possible to develop complex custom applications solely based on spreadsheets, as opposed to applications developed with general purpose programming languages like C++ or VisualBasic from Microsoft Corporation. This can be achieved thanks to the spreadsheet imbedded tools such as macro languages.

Within macros developed thanks to macro language, it is common to have to evaluate how two sets of cells compare together. Such sets of cells are called "series of cells" and are not constrained by any structural rule. When two such series of cells have to be compared, the objective is to determine if the first series of cells (referred to as the series "ASerie"):

either is included in the second series of cells (referred to as the series "BSerie"). In this case all the cells belonging to ASerie also belong to BSerie, but some cells belonging to Bserie do not belong to ASerie. The comparison result between both series is "A_IN_B".

or includes the second series of cells. In this case all the cells belonging to Bserie also belong to ASerie but some cells belonging to ASerie do not belong to Bserie. The comparison result between both series is "B_IN_A".

or are the same. In this case all the cells belonging to ASerie also belong to Bserie, and all the cells belonging to Bserie also belong to ASerie. The comparison result between both series is "SAME".

or overlap. In this case some cells belonging to ASerie also belong to Bserie and some cells belonging to ASerie do not belong to Bserie, and reversibly some cells belonging to Bserie also belong to ASerie and some cells belonging to Bserie do not belong to ASerie. The comparison result between both series is "OVERLAP".

or are disjoined. In this case all the cells belonging to ASerie do not belong to Bserie or reversibly all the cells belonging to Bserie do not belong to ASerie. The comparison result between both series is "DISJOINED".

As previously outlined, conventional techniques based on a "geometrical" comparison of series of cells ask for an excessive complexity resulting both into poor performances and in a lack of flexibility with respect to the characteristics (such as the number of dimensions) of the environment to which the series of cells belong.

The present invention offer a user-friendly solution to this problem by defining a method and a system for comparing series of cells.

In the following, the above-mentioned series of cells will correspond to any set of cells, whether they are or not connex or convex.

B. Series Comparator

In contrast to just-described conventional techniques, the present invention provides a more powerful, efficient and generic method for comparing series of cells in the form of a "Series Comparator". The comparator allows an electronic spreadsheet user to easily and efficiency evaluate how two series of cells compare together.

In a preferred embodiment, the present invention is used in three steps:

1. The first step occurs when the spreadsheet user decides, based on some criteria not detailed here, if two series of cells deserve to take advantage of the present invention, that is to be compared by the Series Comparator. The user or a user written program first invokes a specific command called "CompSeries" thanks to conventional means available in spreadsheet development environment, such as (but not limited to) dedicated push-buttons, keyboard entry short cuts, menu or sub-menu entries. This command carries as parameters the identifiers of the two series of cells to be compared. Such an identifier may for instance correspond to a name, but can take any other form without departing from the spirit of the present invention.

2. The second step occurs while the "CompSeries" command is executed according to the method and system of the present invention. During the execution of the "CompSeries" command, the central processor 101 typically access data within the main memory 102. This main memory storage 102 is used to record a "Comparison Table" 400 as described in FIG. 4. As further described in next section, this table allows to record some key intermediary information used to eventually determine how the two series of cells compare together.

3. The third step occurs when the "CompSeries" command execution completes, so that the result of the series of cells comparison is returned back to the command originator.

C. Comparison Table

The decision to compare two series of cells belongs to the spreadsheet application user. A single repository, called "Comparison Table", is used to record some key intermediary information during the process of series of cells comparison. This Comparison Table is preferably saved on a main memory 102, but could also be saved on a non volatile memory (typically but not necessary as part of the spreadsheet disk file on the mass storage 107).

Referring now to FIG. 4, the Comparison Table 400 corresponds to a logical simple structure made of several records 401, 402, 403 and 404 each of them recording the result of intermediary tests performed during the execution of the "CompSeries" command.

The field 401, referred to as Atrue, is used to record if at least one cell belonging to ASerie has a temporary attribute TempAttribute with the value True after having set the same attribute of BSerie to the value False.

The field 402, referred to as Afalse, is used to record if at least one cell belonging to ASerie has a temporary attribute TempAttribute with the value False after having set the same attribute of BSerie to the value False.

The field 403, referred to as Btrue, is used to record if at least one cell belonging to BSerie has a temporary attribute TempAttribute with the value True after having set the same attribute of ASerie to the value True.

The field 404, referred to as Bfalse, is used to record if at least one cell belonging to BSerie has a temporary attribute TempAttribute with the value False after having set the same attribute of ASerie to the value True.

D. CompSeries Method

Figure 6:
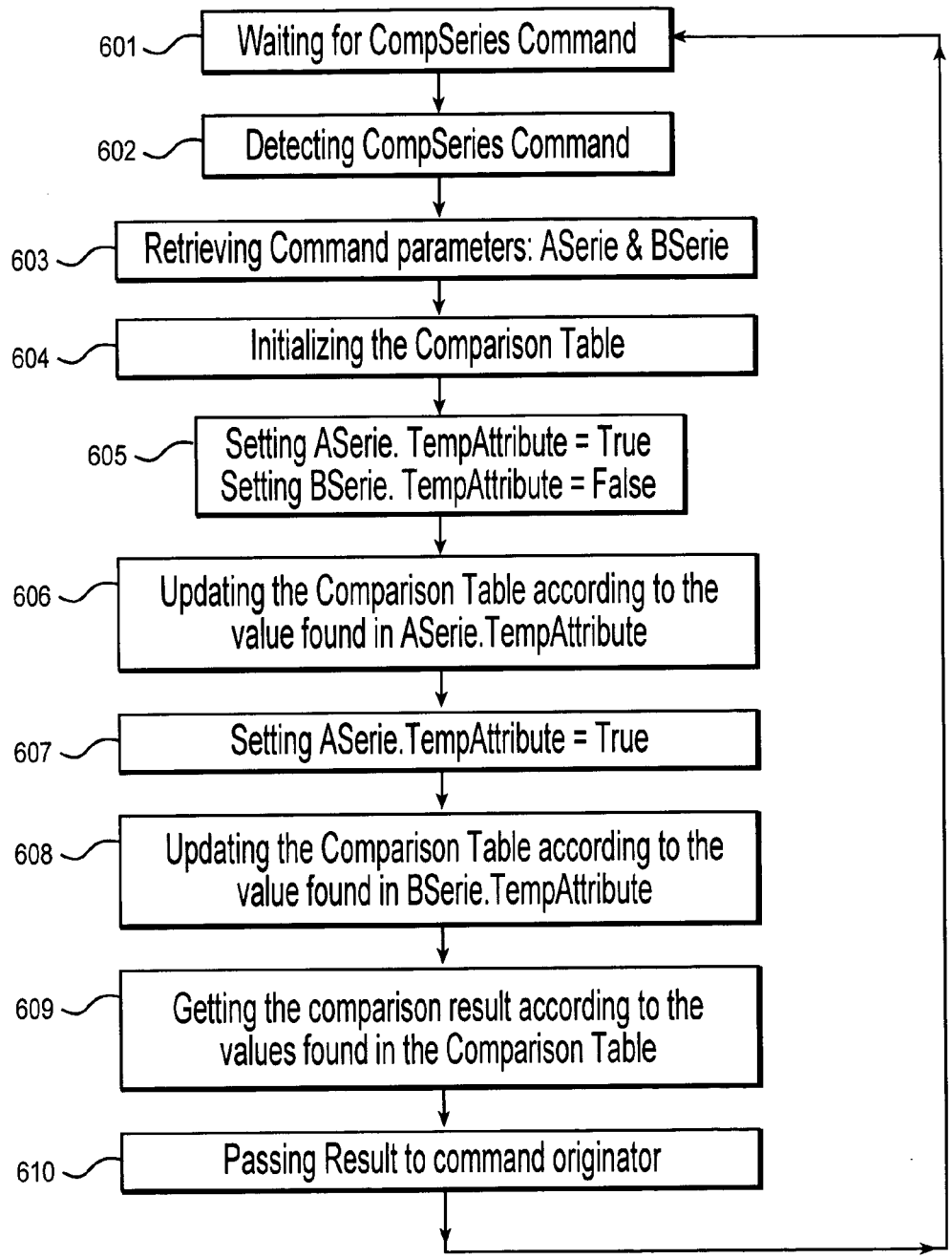
FIG. 6 is a simplified flow chart illustrating the system and method of the present invention.

The method for comparing series of cells to take advantage of the present invention is summarised in flowchart 600 of FIG. 6. The method of comparing two series of cells comprises the following steps:

At step 601, the method is in its default state, waiting for an event to initiate the process by calling the CompSeries command.

At step 602, the CompSeries command is detected.

At step 603, the parameters of the command are retrieved. They correspond to the identifiers of the two series of cells to be mutually compared. The identifier of the first series of cells is referred to as "ASerie" while the identifier of the second series of cells is referred to as "BSerie".

At step 604, the Comparison Table 400 is initialised.

At step 605, the method sets a temporary attribute TempAttribute of the ASerie object to the value True. Then the method sets the same temporary attribute TempAttribute 20 of the BSerie to the value False.

At step 606, a test is performed to get the value of the temporary attribute TempAttribute of the ASerie. Two fields 401 and 402 of the Comparison Table 400 are updated according to the value of this attribute of ASerie.

At step 607, the method sets a temporary attribute TempAttribute of the ASerie object to the value True.

At step 608, a test is performed to get the value of the temporary attribute TempAttribute of the BSerie. Two fields 403 and 404 of the Comparison Table 400 are updated according to the value of this attribute of BSerie.

At step 609, the result of the comparison between the two series of cells ASerie and Bserie is derived from the values of all the fields 401, 402, 403 and 404 of the Comparison table 400.

At step 610, the result of the comparison is passed back to the command originator. Then control is given back to the initial step 601 for waiting for a new command to handle.

Figure 5A:
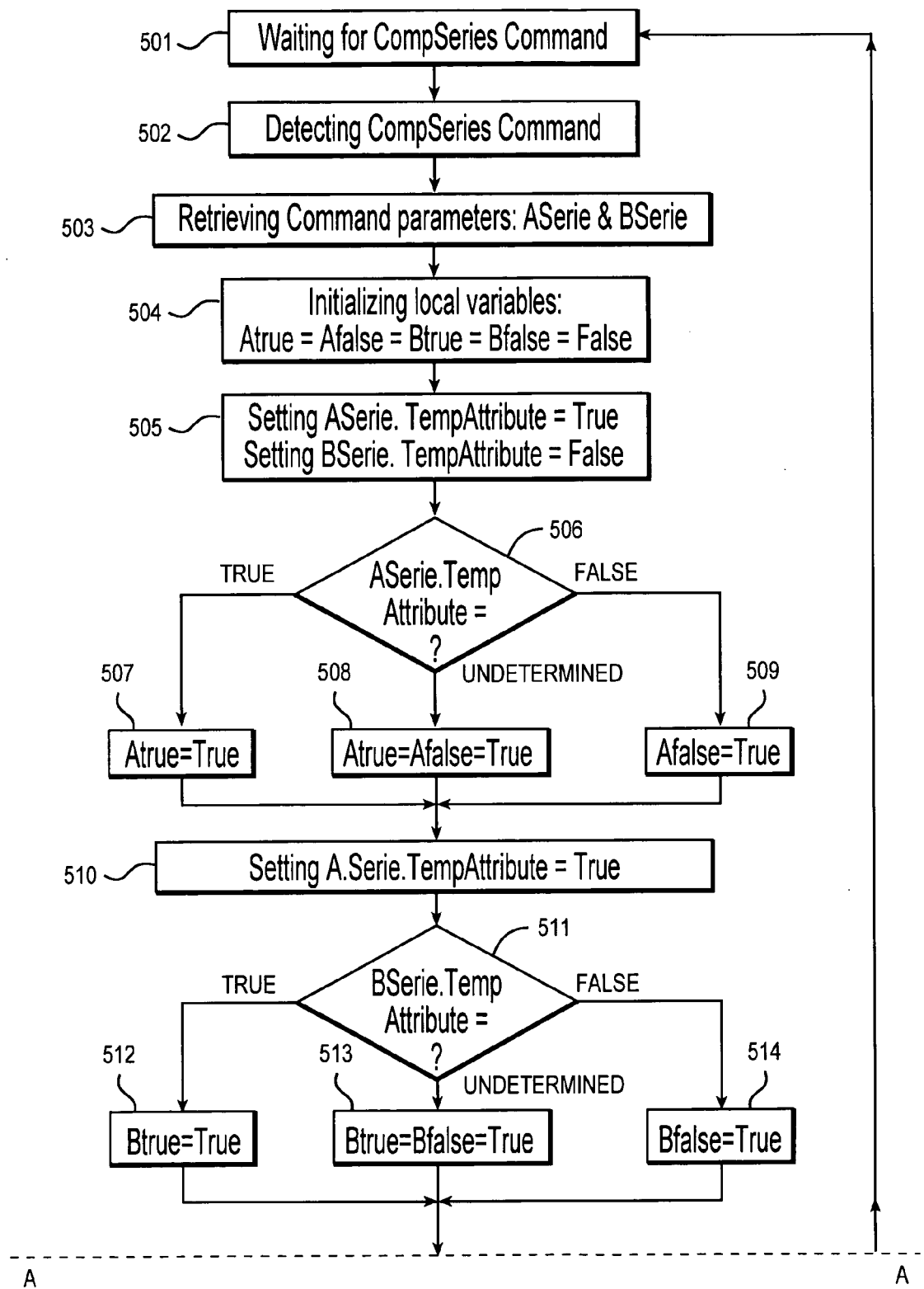
FIG. 5 is a flow chart illustrating a preferred method for comparing series of cells according to the present invention.
Figure 5B:
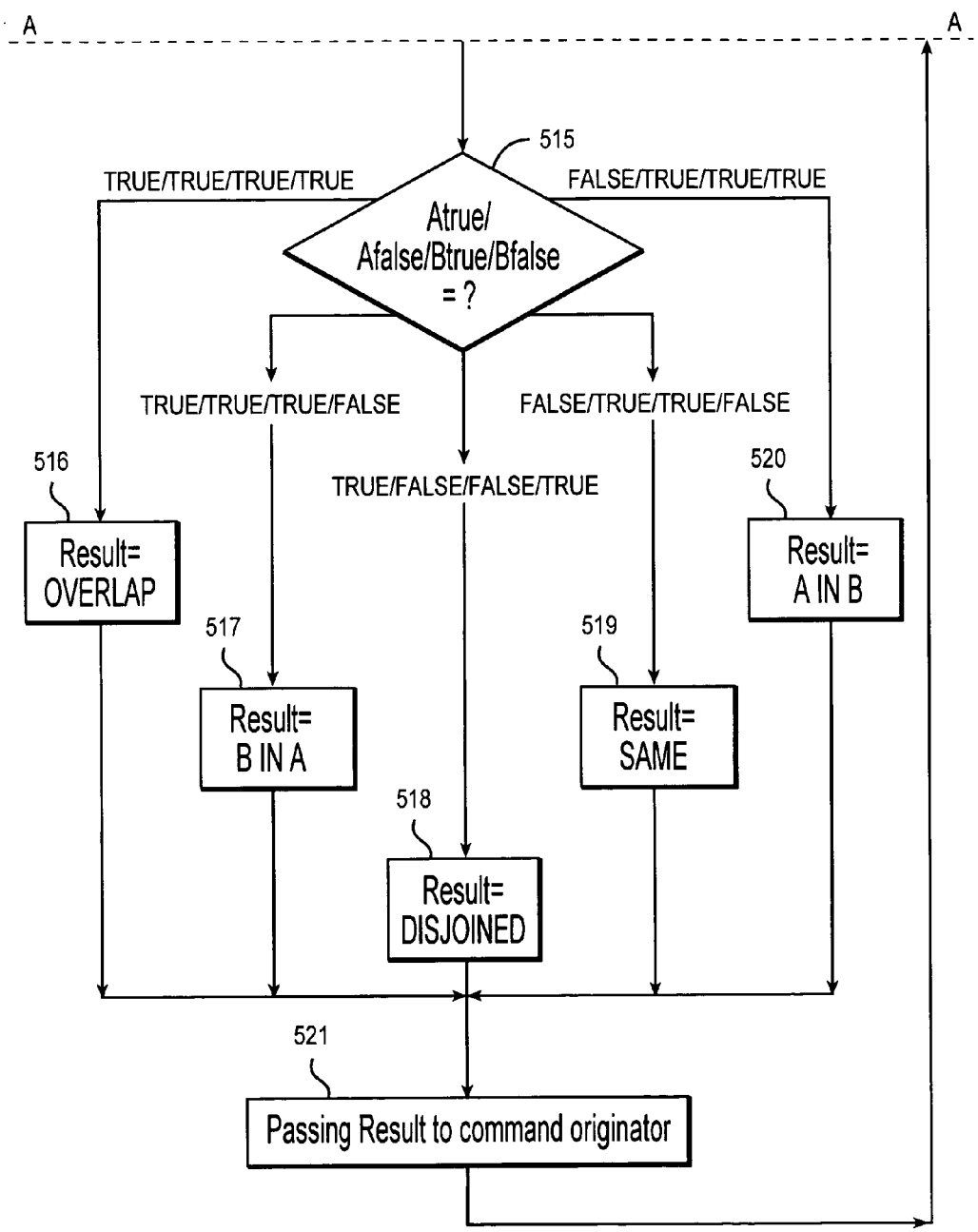

FIG. 5, is a detailed flowchart of the method according to the present invention. This method can be seen as the processing of the CompSeries command:

At step 501, the method is in its default state, waiting for an event to initiate the process by calling the CompSeries command.

At step 502, an event is detected, as a result of either a user action, or a program action. This action can be for instance a specific combination of key on the keyboard 104, or the click of the pointing device 105 on a specific button, or an internal call to a subroutine, or any other similar means not further specified here. In all event cases, the CompSeries command is detected.

At step 503, the parameters of the command are retrieved. They correspond to the identifiers of the two series of cells to be mutually compared. The identifier of the first series of cells is referred to as "ASerie" while the identifier of the second series of cells is referred to as "BSerie".

At step 504, the Comparison Table 400 is initialised. It corresponds to first initialise the Atrue field 401 to the value False, then to initialise the Afalse field 402 to the value False, then to initialise the Btrue field 403 to the value False, and then to initialise the Bfalse field 404 to the value False.

At step 505, the method sets a temporary attribute TempAttribute of the ASerie object to the value True. Due to the inheritance property of this attribute, this also sets the same value True to the same attribute TempAttribute of each cell belonging to ASerie. Then the method sets the same temporary attribute TempAttribute of the BSerie to the value False. Due to the inheritance property of this attribute, this also sets the same value False to the same attribute TempAttribute of each cell belonging to BSerie.

At step 506, a test is performed to get the value of the temporary attribute TempAttribute of the ASerie. The possible values are:

True if all the cells belonging to ASerie have their temporary attribute TempAttribute set to the value True. In this case, control is given to step 507.

False if all the cells belonging to ASerie have their temporary attribute TempAttribute set to the value False. In this case, control is given to step 509.

Undetermined if some cells belonging to ASerie have their temporary attribute TempAttribute set to the value True while some other cells belonging to ASerie have their temporary attribute TempAttribute set to the value False. In this case, control is given to step 508.

At step 507, the Atrue field 401 within the Comparison Table 400 is set to the value True. Then control is given to step 510.

At step 508, the Atrue field 401 within the Comparison Table 400 is set to the value True and the Afalse field 402 within the Comparison Table 400 is set to the value True. Then control is given to step 510.

At step 509, the Afalse field 402 within the Comparison Table 400 is set to the value True. Then control is given to step 510.

At step 510, the method sets a temporary attribute TempAttribute of the ASerie object to the value True. Due to the inheritance property of this attribute, this also sets the same value True to the same attribute TempAttribute of each cell belonging to ASerie.

At step 511, a test is performed to get the value of the temporary attribute TempAttribute of the BSerie. The possible values are:

True if all the cells belonging to BSerie have their temporary attribute TempAttribute set to the value True. In this case, control is given to step 512.

False if all the cells belonging to BSerie have their temporary attribute TempAttribute set to the value False. In this case, control is given to step 514.

Undetermined if some cells belonging to BSerie have their temporary attribute TempAttribute set to the value True while some other cells belonging to BSerie have their temporary attribute TempAttribute set to the value False. In this case, control is given to step 513.

At step 512, the Btrue field 403 within the Comparison Table 400 is set to the value True. Then control is given to step 515.

At step 513, the Btrue field 403 within the Comparison Table 400 is set to the value True and the Bfalse field 404 within the Comparison Table 400 is set to the value True. Then control is given to step 515.

At step 514, the Bfalse field 404 within the Comparison Table 400 is set to the value True. Then control is given to step 515.

At step 515, the method performs a test on the content of the various fields 401, 402, 403 and 404 of the Comparison Table 400. Even if each of these fields can either take the value True or False, representing a set of 16 possible combinations, only five combinations are possible. If the respective fields Atrue 401, Afalse 402, Btrue 403 and Bfalse 404 take the values:

True, True, True and True as shown in FIG. 4 by the Comparison Table example 405, then control is given to step 516.

True, True, True and False as shown in FIG. 4 by the Comparison Table example 406, then control is given to step 517.

True, False, False and True as shown in FIG. 4 by the Comparison Table example 407, then control is given to step 518.

False, True, True and False as shown in FIG. 4 by the Comparison Table example 408, then control is given to step 519.

False, True, True and True as shown in FIG. 4 by the Comparison Table example 409, then control is given to step 520.

At step 516, the result of the comparison of the two series of cells ASerie and BSerie is set to the value "OVERLAP". Then control is given to step 521.

At step 517, the result of the comparison of the two series of cells ASerie and BSerie is set to the value "B_IN_A". Then control is given to step 521.

At step 518, the result of the comparison of the two series of cells ASerie and BSerie is set to the value "DISJOINED". Then control is given to step 521.

At step 519, the result of the comparison of the two series of cells ASerie and BSerie is set to the value "SAME". Then control is given to step 521.

At step 520, the result of the comparison of the two series of cells ASerie and BSerie is set to the value "A_IN_B". Then control is given to step 521.

At step 521, the result of the comparison between the two series of cells ASerie and BSerie, as determined during one of the previous steps 516, or 517, or 518, or 519, or 520, is passed back as the result of the CompSeries command to the originator of the command. Then control is given back to the initial step 501 for waiting for a new command to handle.

The step 515 of determining how the both series of cells ASerie and BSerie mutually compare, can be summarized in an alternate embodiment as follows. The output of the comparison is derived from a decision table taking the following form.

| ASerie<br>BSerie | All cells true | All cells false | Some cells true, some other false |
|---|---|---|---|
| All cells true | n.a. | SAME | B_IN_A |
| All cells false | DISJOINED | n.a. | n.a. |
| Some cells true, some other false | n.a. | A_IN_B | OVERLAP |

B_IN_A: Bserie is included in Aserie
A_IN_B: Aserie is included in Bserie
DISJOINED: ASerie and BSerie are disjoined
SAME: Aserie and Bserie are the same
OVERLAP: Aserie and Bserie are overlapping Alternate Embodiments While the invention has been particularly shown and described with reference to a preferred embodiment, it will be understood that various changes in form and detail may be made therein without departing from the spirit, and scope of the invention.

The Series Comparator method and system according to the present invention may be used advantageously in those environments where elements of information are organised as multidimensional tables having more than three dimensions.

What is claimed is:

1. A method of comparing two series of cells in a multidimensional spreadsheet comprising a plurality of cells identified by a cell address along each dimension, a series of cells comprising one or a plurality of cell range, a cell range comprising one or a plurality of cells, said method comprising the steps of:

defining a Boolean attribute, said Boolean attribute having a first and a second value;

assigning the first value of said Boolean attribute to each cell of a first series of cells;

assigning the second value of said Boolean attribute to each cell of a second series of cells;

determining in a first operation whether all the cells of said first series of cells share the same first value of said Boolean attribute, or share the same second value of said Boolean attribute or do not share single value of said Boolean attribute;

for a second operation, again assigning the first value of said Boolean attribute to each cell of the first series of cells;

determining in a second operation whether all the cells of the second series of cells share the same first value of said Boolean attribute, or share the same second value of said Boolean attribute or do not share a same single value of said Boolean attribute;

recording intermediary information from the first operation and the second operation in a comparison table, stored in a memory of a computer;

determining whether the first series and the second series are the same or not by comparing results of the first operation and the second operation:

if all the cells of the first series share the same second value of said Boolean attribute in said first operation and if all the cells of the second series share the same first value of said Boolean attribute in said second operation, the first series and the second series are the same.

2. The method according to claim 1 wherein the step of determining whether the first series and the second series are the same or not comprises the further step of determining whether the first series and the second series are disjoined or not by comparing the results of the first operation and the second operation:

if all the cells of the first series share the same first value of said Boolean attribute in said first operation and if all the cells of the second series share the same second value of said Boolean attribute in said second operation, the first series and the second series are disjoined.

3. The method according to claim 2 wherein the step of determining whether the first series and the second series are the same or not, comprises the further step of determining whether the first series and the second series overlap or not by comparing the results of the first operation and the second operation:

if all the cells of the first series do not share the same single value of said Boolean attribute in said first operation and if all the cells of the second series do not share the same single value of said Boolean attribute in said second operation, the first series and the second series overlap.

4. The method according to claim 3 wherein the step of determining whether the first series and the second series are the same or not comprises the further step of determining whether the first series and the second series are included one in the other or not by comparing the results of the first operation and the second operation:

if all the cells of the first series share the same second value of said Boolean attribute in said first operation and if all the cells of the second series do not share the same single value of said Boolean attribute in said second operation, the first series is included in the second series;

if all the cells of the first series do not share the same single value of said Boolean attribute in said first operation and if all the cells of the second series share the same first value of said Boolean attribute in said second operation, the second series is included in the first series.

5. The method according to claim 1 wherein said Boolean attribute is temporary.

6. A system comprising:

means for defining a Boolean attribute, said Boolean attribute having a first and a second value;

means for assigning the first value of said Boolean attribute to each cell of a first series of cells;

means for assigning the second value of said Boolean attribute to each cell of a second series of cells;

means for determining in a first operation whether all the cells of said first series of cells share the same first value of said Boolean attribute, or share the same second value of said Boolean attribute or do not share single value of said Boolean attribute;

for a second operation, means for again assigning the first value of said Boolean attribute to each cell of the first series of cells;

means for determining in a second operation whether all the cells of the second series of cells share the same first value of said Boolean attribute, or share the same second value of said Boolean attribute or do not share a same single value of said Boolean attribute;

means for recording intermediary information from the first operation and the second operation in a comparison table, stored in a memory of a computer;

means for determining whether the first series and the second series are the same or not by comparing results of the first operation and the second operation:

if all the cells of the first series share to same second value of said Boolean attribute in said first operation and if all the cells of the second series share the same first value of said Boolean attribute in said second operation, the first series and the second series are the same.

7. A computer readable medium comprising instructions adapted for carrying out the method according to claim 1.

* * * * *